Patented June 3, 1941

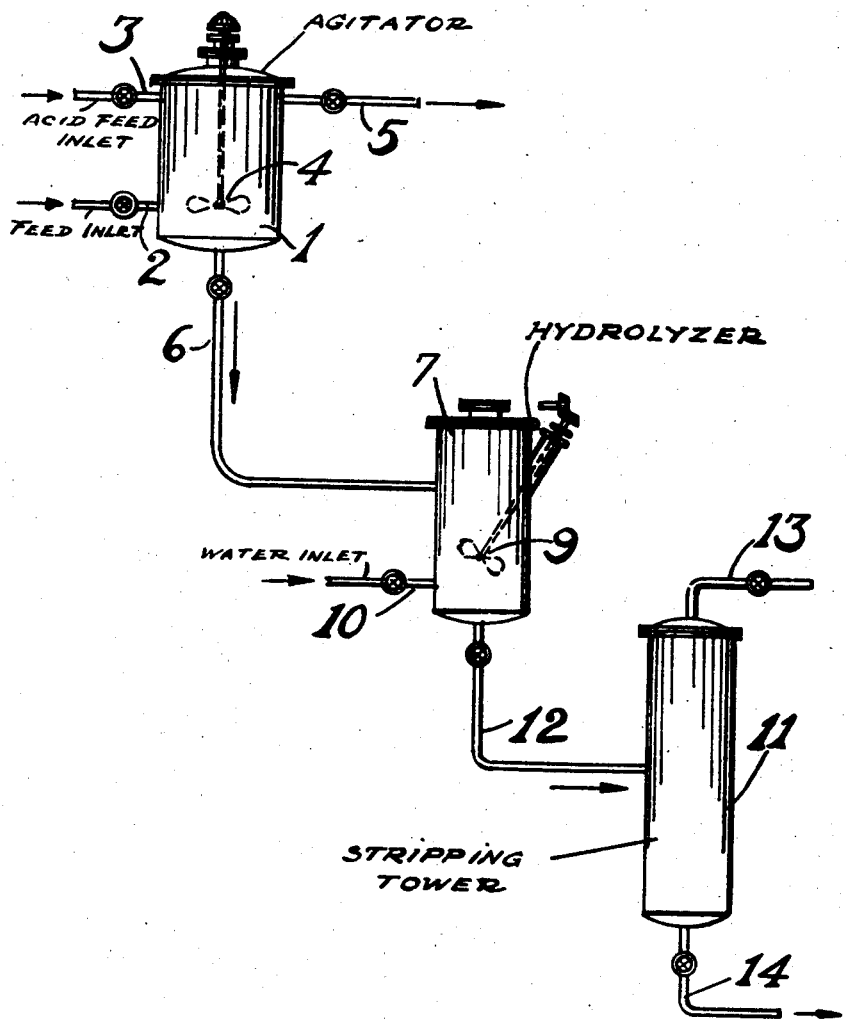

2,243,991

UNITED STATES PATENT OFFICE 2,243,991

PREPARATION OF ALKYL ESTERS

Hans G. Vesterdal, Elizabeth, N. J., assignor to Standard Alcohol Company

Application November 24, 1937, Serial No. 176,165

6 Claims. (Cl. 260—460)

The present invention is concerned with the process of manufacturing esters from unsaturated hydrocarbons. It especially relates to the process of manufacturing esters from olefin containing hydrocarbons by treating said hydrocarbons with a strong polybasic mineral acid under conditions to form mono and dialkyl esters of the mineral acid. These esters can be hydrolyzed to form alcohols. The invention is particularly concerned with the process of using a mixture of phosphoric acid and fuming sulphuric acid to esterify the olefines whereby the yield of alcohols is increased and the polymer formation greatly diminished. The invention especially relates to increasing the speed of reaction in the manufacture of higher alcohols whereby higher olefins may be treated in a continuous system for a very limited time of contact with a minimum of polymer formation.

It is well known to treat unsaturated hydrocarbons such as ethylene, propylene and the like with sulphuric acid to form the corresponding esters and then to hydrolyze said esters by means of water and to distill off the alcohols formed. In this process it is desirable to accelerate the reaction thereby increasing the capacity of the treating equipment by treating with relatively strong or fuming sulphuric acid. This, however, has the disadvantage in that it greatly increases the amount of undesirable polymer formation with the resulting decrease in yield of alcohols. The present invention by utilizing a mixture of fuming sulphuric acid and phosphoric acid greatly accelerates the reaction and diminishes the time of contact while at the same time the process increases yields of alcohol and decreases the undesirable polymer yield to a minimum.

The invention will be more clearly understood by referring to the drawing which shows a typical flow plan showing one particular modification of the invention. This process flow plan given for illustration relates particularly to the manufacture of butyl alcohol from butylenes. In this process a raw liquid fraction known in the petroleum industry as a butane cut containing butylenes, which has been segregated with suitable equipment for instance from refinery gases evolved from petroleum distilling, cracking and naphtha reforming operations, is fed into agitator 1 by means of feed line 2. A mixture of fuming sulphuric acid and phosphoric acid of the desired strength is introduced into agitator 1 by means of feed line 3 and a complete mixing secured by the revolving stirrer 4. The unreacted materials of the butane cut are removed from agitator 1 by means of line 5 and are suitably treated as, for example, with a caustic solution to remove any entrained acid and are then used for other purposes. The acid olefin reaction liquor of agitator 1 containing isobutyl acid sulfate and diisobutyl acid phosphate is withdrawn from agitator 1 by means of line 6 and introduced into hydrolyzer 7, wherein it is thoroughly mixed by means of stirrer 9 with water introduced through line 10. The reaction products comprising butyl alcohol, sulphuric acid, phosphoric acid and water, are introduced into steam stripping tower 11 through line 12 wherein the alcohols are separated and taken overhead through line 13 while the other products are removed through line 14.

The process may be varied or altered within wide limits. For example, temperatures, pressures, acid strength, feed rates and any particular method of mixing or treating may be widely varied. The conditions are adapted to the particular olefins or to the particular mixture of olefins or to the olefin containing fraction which is being treated in order to secure various products and optimum yields as, for example, in order to secure a maximum yield of a particular alcohol such as butyl alcohol. For example, in the manufacture of butyl alcohols from a butane cut fraction containing butylenes, it is desirable to use an acid mixture of approximately 50 volumes of sulphuric acid containing 20% by weight of free sulphur trioxide and 50 volumes of 85% by weight phosphoric acid. In this operation it is desirable to maintain a pressure of approximately 25 pounds gauge and a temperature of about 60° F. in agitator 1. In the manufacture of isopropyl alcohol an acid mixture of approximately 75 volumes sulphuric acid containing 20% by weight free sulphur trioxide and 25 volumes of 85% by weight phosphoric acid is desirable. In this process tower 1 is maintained at a pressure of about 80 pounds gauge and at a temperature of about 75° C. In the manufacture of amyl and hexyl alcohol from a so-called pentane-hexane cut, segregated by means of suitable fractionating equipment from refinery gases secured by distilling, cracking and naphtha reforming operations, an acid mixture of about 75 volumes of sulphuric acid containing approximately 20% by weight of free sulphur trioxide and 25 volumes of 85% by weight phosphoric acid is preferred. The temperature of agitator 1 in this operation is preferably maintained between 10 and 50° F., preferably at a temperature of about 35° F. In the manufacture of heptyl alcohol, which may be segregated as described above, somewhat higher temperatures are employed, preferably in the range from 30 to 60° F. The pressure employed in the manufacture of amyl hexyl and heptyl alcohol is preferably atmospheric although higher pressures may be employed. The preferred acid mixture in the manufacture of heptyl alcohol is 75 volumes of sulphuric acid containing 65% by weight of free sulphur trioxide and 25 volumes of 85% by weight of phosphoric acid.

The following examples are given as specific methods of making alcohols and serve to illustrate the invention:

EXAMPLE 1

A hydrocarbon fraction boiling in the pentane-hexane range and known in refinery practice as a pentane-hexane cut, was segregated by means of suitable distilling equipment. This material, having an analysis of approximately 66% pentanes and hexanes and 34% pentenes and hexenes, was then sulfated with various sulfating agents under different conditions to form derivatives and was then hydrolyzed to produce amyl and hexyl alcohols. The following table summarizes the respective results secured:

*Sulfation of a pentane-hexane fraction, followed by hydrolysis to produce amyl and hexyl alcohols*

| | Volumes | | Sulfating agent | Temperature | Time of contact | Yields vol. based upon pentanes-hexenes present | |
|---|---|---|---|---|---|---|---|
| | Pentane hexane fraction | Sulfating reagent | | | | Alcohol | Polymer |
| | | | | °F. | | | |
| A | 100 | 10 | 95% H₂SO₄ | 60 | 3 hrs | 24.1 | 9.7 |
| B | 100 | 18 | Fuming H₂SO₄, 20% SO₃ | 35–40 | 300 sec | 25.0 | 47.0 |
| C | 100 | { 15 / 15 } | Fuming H₂SO₄, 20% SO₃ 85% phosphoric acid | 35–40 | 305 sec | 25.0 | 4.7 |
| D | 100 | { 16.5 / 5.5 } | Fuming H₂SO₄, 20% SO₃ 85% phosphoric acid | 35–40 | 76 sec | 37.9 | 17.7 |

The above results, A and C, demonstrate that the time of contact may be decreased from 3 hours to approximately 5 minutes when securing approximately the same alcohol yield. At the same time, the yield of undesirable polymer is reduced by approximately 50%. The results also demonstrate that with approximately the same time of contact and the same alcohol yield, the yield of undesirable polymer may be decreased approximately 90% by the process of the present invention. A comparison of the results of B and D demonstrates that the process of the present invention may increase the yield approximately 50% with a time of contact of 76 seconds as compared to 300 seconds when using fuming sulphuric acid. The yield of polymer is 17.7 as compared to 47 when using the fuming sulphuric acid.

EXAMPLE 2

A hydrocarbon fraction, known in the petroleum industry as cracked wax, was distilled and the fraction boiling in the heptane range was segregated. This heptane fraction was then sulfated with various sulfating agents and then hydrolyzed to produce heptyl alcohol. The following table tabulates the results secured:

*Sulfation of a heptane fraction from cracked wax followed by hydrolysis to produce heptyl alcohol*

| | Volumes | | Sulfating agent | Temperature | Time of contact | Yields vol. based upon heptane fraction present | |
|---|---|---|---|---|---|---|---|
| | Heptane fraction | Sulfating reagent | | | | Alcohol | Polymer |
| | | | | °F. | Seconds | | |
| A | 100 | 47 | 95% H₂SO₄ | 110–120 | 510 | 25 | 16.6 |
| B | 100 | 24 | Fuming H₂SO₄, 20% SO₃ | 60 | 110 | 34.5 | 10.8 |
| C | 100 | { 10.4 / 3.4 } | Fuming H₂SO₄, 65% SO₃ 85% phosphoric acid | 50 | 115 | 22.2 | 5 |
| D | 100 | { 15 / 5 } | Fuming H₂SO₄, 65% SO₃ 85% phosphoric acid | 35–40 | 114 | 26 | 4.8 |

These results demonstrate that for the same yield of alcohol, the time of contact may be reduced to one-fifth by the process of the present invention, resulting in the formation of only 25% of the undesirable polymers secured when using concentrated sulphuric acid. The temperature and pressure conditions may vary widely and be adjusted to secure the optimum yields when treating a particular feed stock or when it is desirable to secure a particular product. Feed rates may be adjusted to secure optimum yields of the particular product desired.

For example, a petroleum fraction known in the petroleum industry as a butane cut, may be segregated from the refinery gases by means of suitable distilling equipment. This butane cut has approximately the following analysis:

| | Percent |
|---|---|
| Isobutane | 15 |
| Beta butylene | 18 |
| Isobutylene | 14 |
| Alpha butylene | 7 |
| Normal butane | 46 |

This feed material is led into agitator 1 and treated with an acid mixture of 50 volumes of sulphuric acid containing 20% by weight of sulphur trioxide and 50 volumes of 85% by weight of phosphoric acid. The temperature of agitator 1 is maintained at about from 60° F. to 80° F.

at a pressure of about 25 pounds gauge. The spent naphtha and the acid derivatives are being treated in the manner described. Conditions may thus be suitably adjusted in the manufacture of propyl or other alcohols.

The present invention is desirable in that it secures a high speed of reaction which permits large throughputs and yields for a fixed capacity. The invention also secures high yields in that it greatly decreases the amount of undesirable polymer formation since there is considerably less tendency to polymerize the olefins than when using fuming sulphuric acid. It is particularly desirable in that it permits the production of higher alcohols having more than 6 carbon atoms in the molecule from the higher olefin which heretofore has not been practical due to excessive polymerization. The process of the present invention by greatly increasing the speed of reaction permits these alcohols to be manufactured in a continuous process without undue polymer formation.

The feed material may be pure olefines or mixtures of pure olefines. The olefines may also be contained in hydrocarbons which do not react with the acid mixture. Preferred feed materials are hydrocarbon fractions containing unsaturated materials secured in refining, cracking and distilling operations.

By this process, olefines containing 10 to 18 carbon atoms in the molecule may be treated at a short time of contact to produce the corresponding alkyl compounds of the mineral acids. These acid alkyl sulfates and phosphates may be hydrolyzed to the corresponding alcohols or they may be neutralized with a suitable base to form detergents.

The present invention is not to be limited by any particular example given or by any theory of operation but only by the following claims in which it is desired to claim all novelty in so far as the prior art permits.

I claim:

1. Process for the production of esters from olefins comprising contacting said olefins of higher molecular weight than ethylene with a mixture of phosphoric acid and fuming sulfuric acid to form acid olefin esters, under conditions under which no substantial sulfonation of the olefins takes place.

2. Process in accordance with claim 1 in which said acid mixture comprises 50 to 75% by volume of 20% oleum and 25 to 50% by volume of 85% phosphoric acid.

3. Process for the production of esters from olefins of higher molecular weight than ethylene comprising contacting said olefins with a mixture of phosphoric and fuming sulfuric acids at a reaction temperature unfavorable to sulfonation for a time of contact of less than two minutes to form acid olefin esters.

4. Process in accordance with claim 3 in which the olefin is in a hydrocarbon liquid containing a substantial quantity of butylenes.

5. Process in accordance with claim 3 in which a hydrocarbon liquid containing a substantial proportion of pentenes and hexenes is treated with a mixture of phosphoric acid and fuming sulfuric acid containing 25% to 50% by volume of 85% phosphoric acid and 50% to 75% by volume of fuming sulfuric acid containing 20% of sulfur trioxide for a time of contact of less than two minutes and at a temperature of about 35° F. to form acid olefin esters.

6. Process in accordance with claim 3 in which a hydrocarbon liquid containing a substantial proportion of hexenes and heptenes is treated with a mixture of phosphoric acid and fuming sulfuric acid at about 40° to about 50° F. for a time of contact of less than two minutes to form acid hexyl and heptyl esters.

HANS G. VESTERDAL.